July 9, 1963
R. OLSON
3,096,875
TRAP STRUCTURE FOR LINK BELT
Filed July 6, 1960
2 Sheets-Sheet 1
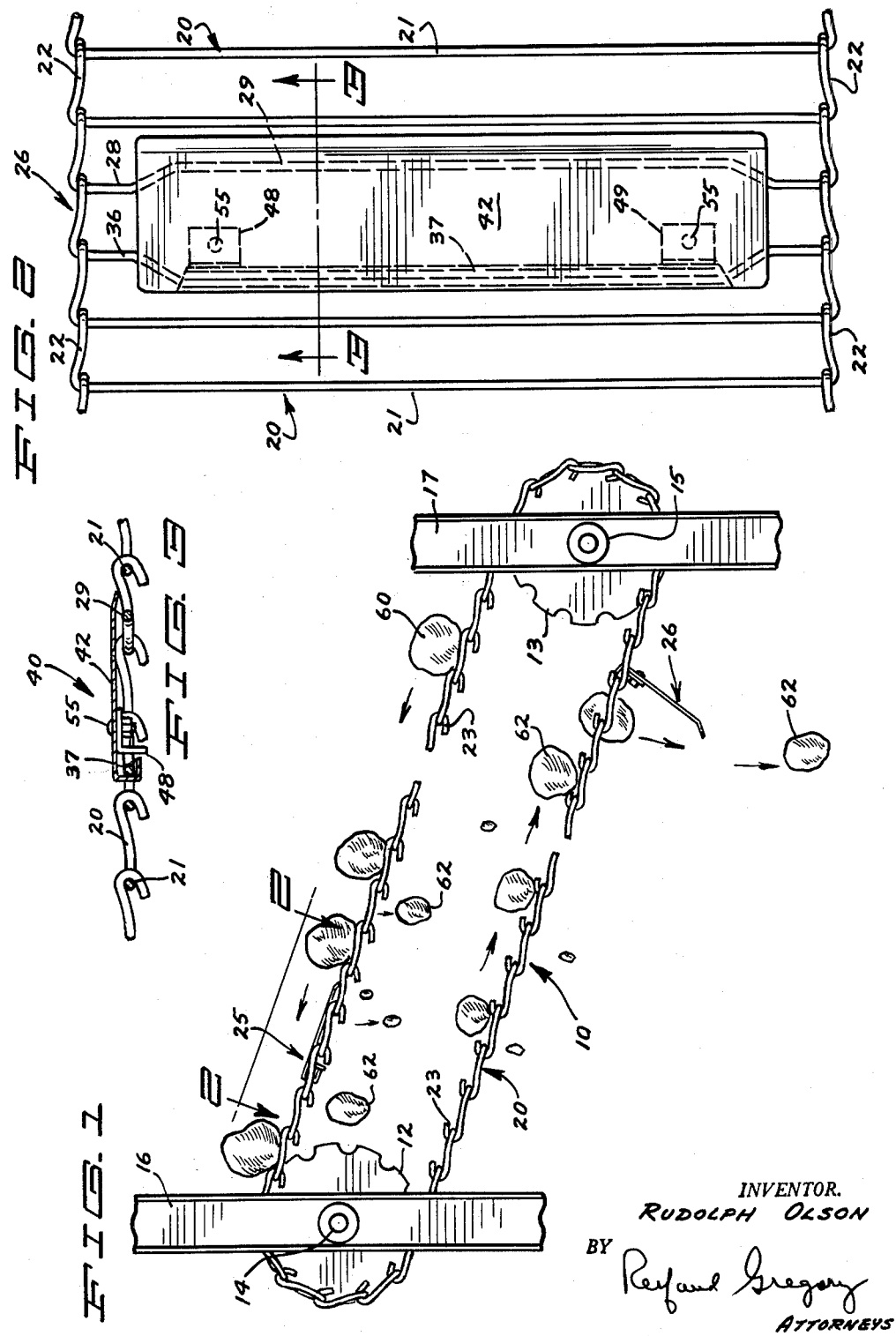
INVENTOR.
RUDOLPH OLSON
BY
Reyland Gregory
ATTORNEYS July 9, 1963 R. OLSON 3,096,875
TRAP STRUCTURE FOR LINK BELT
Filed July 6, 1960 2 Sheets-Sheet 2
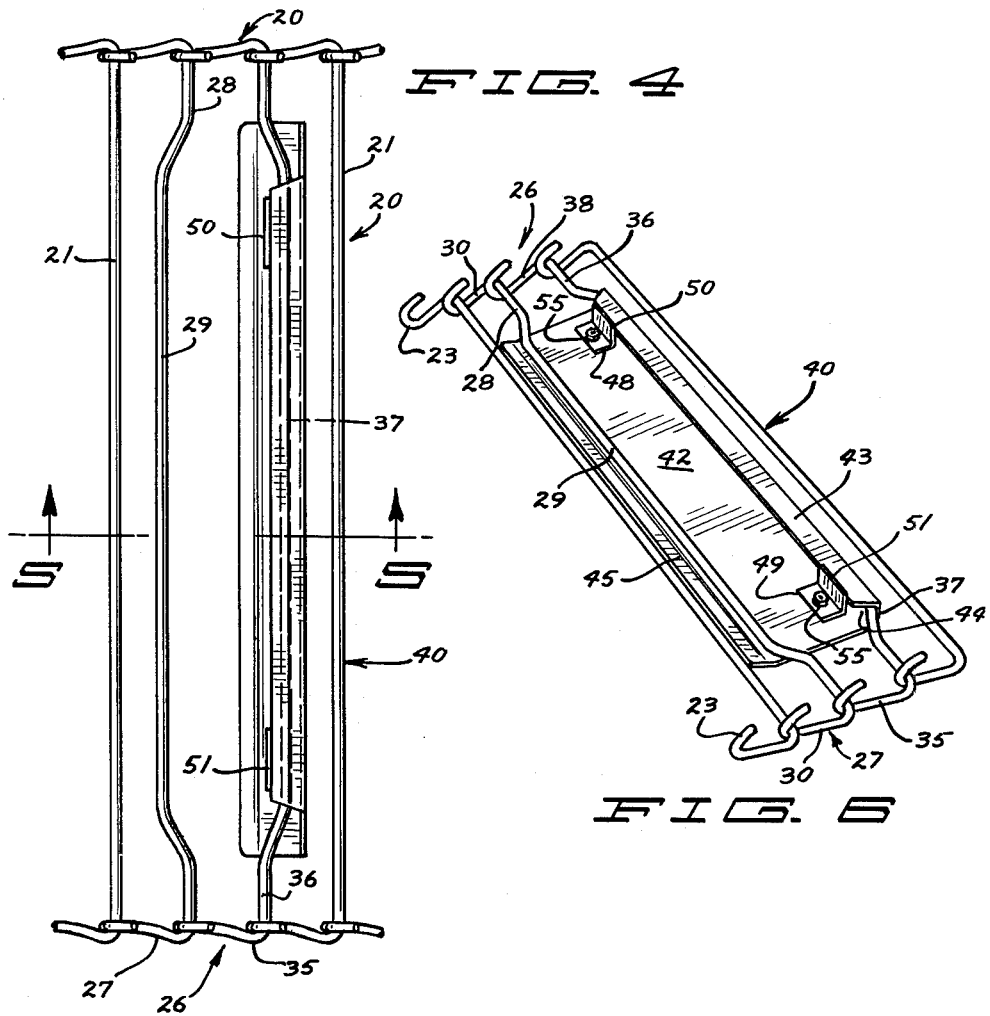
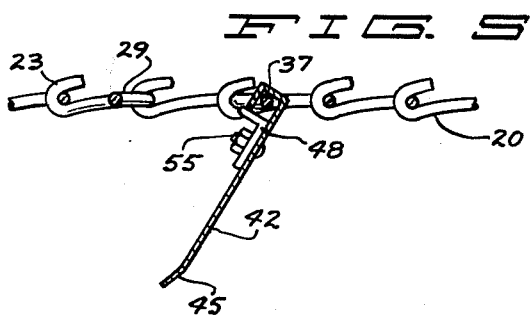
INVENTOR.
RUDOLPH OLSON
BY Reyaud Gregory
ATTORNEYS 3,096,875
TRAP STRUCTURE FOR LINK BELT
Rudolph Olson, Franklin, Minn., assignor to Dahlman Manufacturing & Sales, Inc., Braham, Minn., a corporation of Minnesota
Filed July 6, 1960, Ser. No. 41,171
1 Claim. (Cl. 198—195)

This invention relates to a release trap structure for an endless link belt such as would be used in connection with a potato harvester. In digging potatoes and in moving them on an endless belt, hard lumps and stones in addition to potatoes are picked up. Many of the lumps and stones and the smaller potatoes are of a size whereby they tend to drop through the upper run of a link belt of a type generally in use. This material dropping through the upper run tends to accumulate on the lower run of such a belt. This material further tends to accumulate and pile up at the lowest point of the lower run. This accumulation of material creates an operating problem. It requires manual dumping even to the point of first stopping the operation of the harvester.

Thus it is desirable to have some means in connection with the construction and operation of an endless belt to have at some certain point thereon means for automatically dumping or discharging accumulated material from the lower run thereof.

It is an object of this invention therefore to provide an endless belt made and constructed to rid itself of material which tends to gether on its lower run.

It is another object of this invention to provide an endless link belt having in connection therewith at one certain point thereon means for automatically dumping or discharging accumulation of material from the lower run thereof.

It is also an object of this invention to provide in an endless belt certain adjacent linkage having a wider spacing than otherwise in the lower run of said belt for automatically dumping material accumulating on said lower run.

It is a further object of this invention to provide an endless belt having between certain adjacent links at certain intervals thereon a spacing of a certain greater width than is otherwise present, means for bridging said spacing in the upper run of said belt, and means for automatically opening up said spacing in the lower run of said belt to provide for self dumping for the discharge of material accumulated on the lower run of said belt.

These and other objects and advantages of the invention will be fully set forth in the following description made in connection with the accompanying drawings in which like reference characters refer to similar parts throughout the several views and in which:

FIG. 1 is a view in side elevation showing a broken away portion of a frame structure, as of a potato harvester, with applicant's invention in operating position on a link belt;

FIG. 2 is a top plan view on an enlarged scale taken on line 2—2 of FIG. 1, as indicated by the arrows;

FIG. 3 is a view in vertical cross section, as of the top run of a belt, taken on line 3—3 of FIG. 2 as indicated by the arrows;

FIG. 4 is a view in plan similar to FIG. 2 of the lower run of a belt showing a portion thereof in depending position;

FIG. 5 is a view in vertical section taken on line 5—5 of FIG. 4 as indicated by the arrows; and FIG. 6 is a top plan view similar to FIG. 2 taken of the lower run of said belt.

Referring to the drawings, an endless belt 10 is indicated such as would be used in connection with a potato harvester. Only sufficient supporting structure is here shown to indicate the operation of said belt. As viewed in FIG. 1, said belt is shown in an elevational view as passing over sprockets 12 and 13 which are respectively carried on shafts 14 and 15 which in turn are shown supported by and journaled in upstanding frame members 16 and 17 of which only broken away portions are here shown.

Said belt 10 is comprised in the main of links 20 which are uniformly spaced apart a certain distance to support thereon potatoes of a certain minimum size or greater. Said links are formed of straight cross bar portions 21 in parallel relation to one another and adapted to move through the same planes. Said cross bar portions have substantially right-angled somewhat inwardly inclined side portions 22 having downwardly reversely curved end portions 23, as indicated in FIGS. 1–3 whereby said links are adapted to be interengaged as shown in FIGS. 1–3.

Spaced at certain intervals in said endless belt 10 are applicant's release trap structures 25 and 26 which form an integral part of said belt and which here are shown to be two in number spaced equal distances apart about said belt.

Said release trap structures are identical in construction and only the release trap 26 will be described. In the embodiment of the invention here disclosed, said release trap 26 comprises a pair of adjacent links 27 and 35. Said link 27 comprises a cross bar 28 having a substantial central portion thereof forming an offset portion 29 with said link 35 having a cross bar 36 having a substantial central portion 37 offset oppositely of said portion 29 of a like length and parallel thereto and in the same plane therewith in the upper and lower runs of said belt.

The end portions 30 and 38 of said links 27 and 35 are identical in construction with the end portions of said links 20 and interengage with the adjacent links 20. The spacing between said offset portions 29 and 37 is substantially greater than the spacing between that of the cross bars of the links 20.

Freely swingably hinged to said offset portion 37 is a swingable closure member 40. Said member 40 may be variously formed but is here shown in the form of a plate member having a substantially flat body portion 42 having a length substantially the width of said offset portion 37. The side edge portion 43 adjacent said offset portion 37 is reversely bent to form a channel 44 into which is removably disposed said offset portion 37 and thus a hinge is formed. The opposite side edge portion 45 of said plate member 40 is inclined slightly downwardly when on the upper run of said link belt to overlie said offset portion 29. Adjacent either end of said plate member 40 at the under side thereof and adjacent said bent portion 43 are brackets 48 and 49 to removably confine said offset portion to said channel 44 whereby plate member 40 is removably pivotal about said link 35. Said brackets 48 and 49 comprise right-angled plate members having upstanding portions 50 and 51 abutting against the leading edge portion of said bent portion 43 and having their forwardly extending base portions removably secured to said plate portion 42 by bolts 55.

With reference to FIG. 1, the character 60 indicates potatoes riding on said belt 10 while relatively small sized material 62 such as small potatoes, lumps of dirt and stones are shown dropping through the upper run onto the lower run and being dumped or discharged through the depending plate member 40.

In operation, applicant's invention has proved to be very successful. Only one or two of applicant's trap structures will be required in an endless run of a belt depending on soil conditions. As is obvious from the above description, the construction of applicant's trap structure makes it interchangeable with regular link structures so that any desired number may be readily installed in a belt or removed as conditions warrant.

The offset cross bar portions 29 and 37 being oppositely offset provide a space which is ample to have readily discharged or dumped therethrough all the material which might fall through the upper run of the belt. On the upper run the plate 40 will overlie or bridge over the links 27 and 35 and thus form a supporting surface in the upper run of the belt, but as this trap structure moves into the lower run of the belt, plate 40 will swing downwardly freely opening up the space between said offset link portions 29 and 37.

The material on the lower run of the belt will tend to accumulate at its low point, which in many instances may be formed as a sag in the belt, and at this point the material 62 will be discharged automatically through applicant's trap structure. Applicant's trap structure will be installed so that the hinge portion thereof will be the portion first to move upwardly as the lower run moves into the upper run of the belt.

Thus it is seen that I have provided a very convenient means for discharging material from the lower run of an endless link belt and one which may be installed or removed with equal readiness in accordance with conditions at hand.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

An endless link belt of uniformly spaced parallel cross bars containing a self releasing trap structure having in combination, adjacent cross bars of a certain pair of links of said belt being respectively offset oppositely of one another in the plane of the top run of said belt forming a wider spacing therebetween than is present between the adjacent cross bars of the remainder of links of said belt, a plate member having a length substantially the width of said link belt and a width substantially that of said wider spacing, a lengthwise edge portion of said plate member being reversely bent to form an open-sided channel receiving therein one of said offset cross bars, a pair of spaced brackets removably secured to said plate member and having upstanding portions overlying portions of said open side of said channel removably securing said cross bar therein, the opposite edge portion of said plate member being bent slightly out of the plane of said plate member to overlie the other of said offset cross bars having said inclined edge portion disposed below the plane of the top run of said belt.

References Cited in the file of this patent
UNITED STATES PATENTS

| | | |
|---|---|---|
| 104,782 | Slusser | June 28, 1870 |
| 861,484 | Stewart | July 30, 1907 |
| 1,354,553 | Harter | Oct. 5, 1920 |
| 1,715,218 | Wright et al. | May 28, 1929 |

FOREIGN PATENTS

| | | |
|---|---|---|
| 1,105,169 | France | Nov. 28, 1955 |